(No Model.)
F. E. FOOR.
FENCE.
No. 579,477.  Patented Mar. 23, 1897.
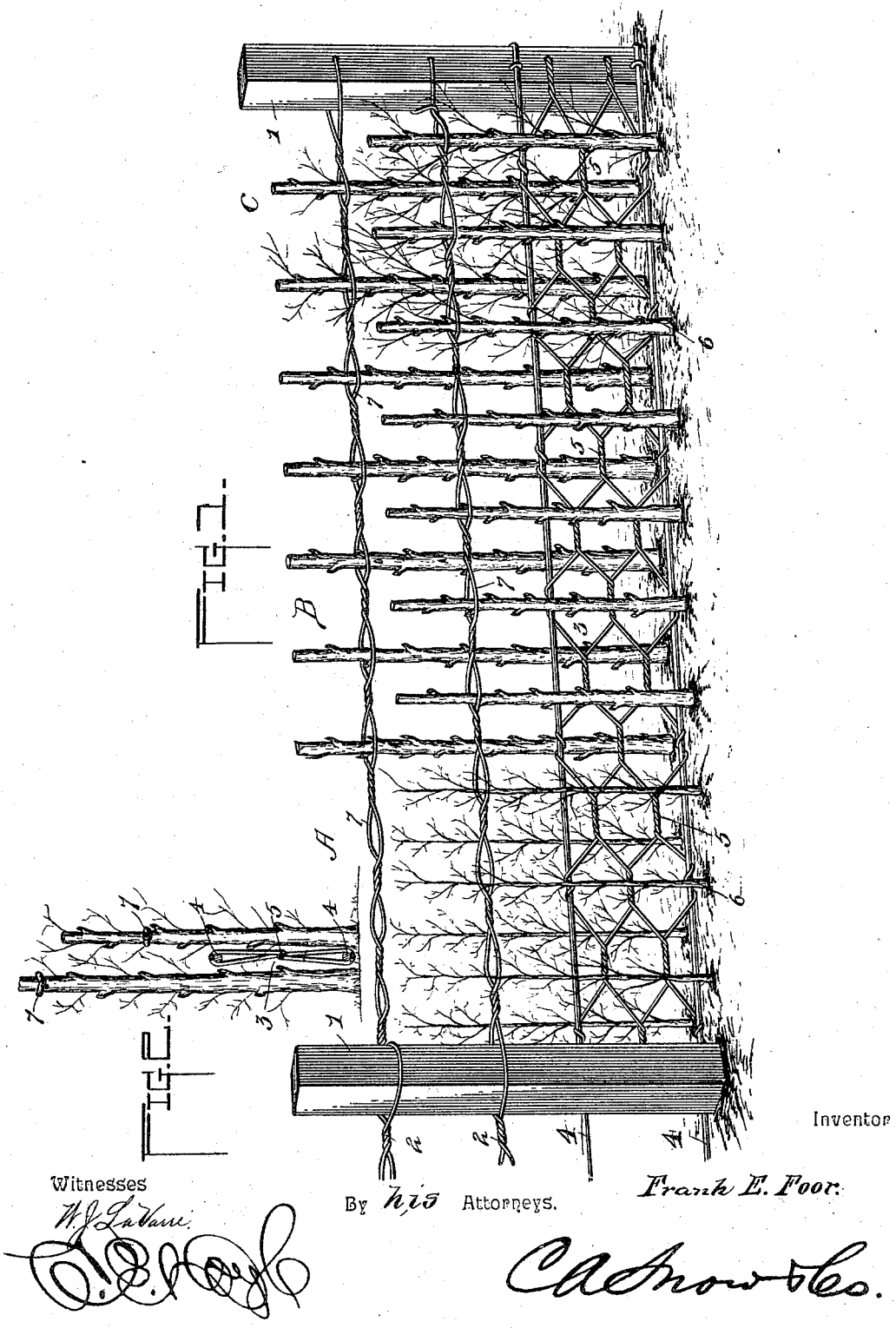
Witnesses
Inventor
Frank E. Foor.
By his Attorneys.

UNITED STATES PATENT OFFICE.

FRANK E. FOOR, OF LEBANON, INDIANA.

FENCE.

SPECIFICATION forming part of Letters Patent No. 579,477, dated March 23, 1897.

Application filed October 16, 1896. Serial No. 609,082. (No model.)

*To all whom it may concern:*

Be it known that I, FRANK E. FOOR, a citizen of the United States, residing at Lebanon, in the county of Boone and State of Indiana, have invented a new and useful Fence, of which the following is a specification.

My invention relates to hedge fences, and has for its object to provide such a construction and arrangement of parts as to adapt the fence to turn stock from the time that the same is laid out and canes planted, in order to avoid the delay common in the construction of fences of this class which is incident to the growth of the canes and the time necessary to allow the same to attain the necessary strength.

Further objects and advantages of this invention will appear in the following description, and the novel features thereof will be particularly pointed out in the appended claims.

Figure 1 represents a perspective view of a hedge fence constructed in accordance with my invention and showing at different points the stages of growth of the canes and the arrangement thereof at said stages with relation to the stays forming the other members of the structure. Fig. 2 is a vertical transverse section of the same.

Similar numerals of reference indicate corresponding parts in both figures of the drawings.

In the construction embodying my invention I employ posts 1, spaced at long intervals and connected by runners for attachment to the canes after the latter have grown to the proper height, in order to strengthen and hold the canes in proper position. In the construction illustrated in the drawings a plurality of runners 2 connect the posts above a fence-ribbon 3, constructed of wire fabric and having border-wires 4 and interposed wire filling 5. This ribbon and the superjacent runners 2 are preferably arranged in position at the time of planting the canes 6, which are arranged in two rows, respectively, upon opposite sides of the plane of the ribbon and in a zigzag or staggered series, whereby the canes at one side of the ribbon are arranged opposite the intervals between the canes at the other side thereof. With this arrangement it will be understood that the fence-ribbon and runners serve to turn stock during the growth of the canes, as indicated at A in the drawings, and when the canes reach a sufficient height they are trimmed as in the ordinary practice and inserted through loops 7 in the runners, as shown at B. At C, I have shown the appearance of the fence subsequent to the engagement of the canes with the loops of the runners and after the former have had sufficient time to sprout, thus forming a network of twigs between the contiguous stands of cane and in time completely filling the intervals.

During the growth of the canes they are not exposed to the attacks of animals by reason of the wire structure forming a protection therefor, the ribbon 3 being arranged between the parallel rows of plants and the runners being arranged, respectively, in the planes of said rows, whereby when the canes attain a sufficient height they may be introduced into the loops 7 without lateral bending. It will be seen, furthermore, that the canes, after engagement with the loops of the runners, retain their upright positions, not being bent longitudinally or in a direction parallel with the fence, as in the ordinary practice. The objection to bending the canes is that it interferes with the growth thereof and frequently results in destroying the same, thus necessitating replanting at intervals or else leaving weak points in the fence.

The ribbon of wire fabric performs a function after the canes have become full grown, as well as during the growth thereof, inasmuch as it prevents small stock from passing between the separated trunks or stems of the canes, the latter being but sparsely provided with branches at points contiguous to the ground.

Various changes in the form, proportion, and the minor details of construction may be resorted to without departing from the spirit or sacrificing any of the advantages of this invention.

Having described my invention, what I claim is—

1. In a hedge fence, the combination with canes arranged in parallel rows, of a fencing-ribbon arranged horizontally between said rows of canes and contiguous to the surface of the ground, and runners arranged respectively in the planes of said rows and provided with means for engaging the stems of the canes, substantially as specified.

2. A hedge fence having canes arranged in parallel rows, and runners arranged respectively in the planes of said rows and provided in the planes of the canes with loops to receive the latter, whereby the canes are supported in upright positions, substantially as specified.

3. A fence having spaced posts, a horizontal fencing-ribbon stretched between the bases of the posts, and runners arranged at different heights above the upper edge of the fencing-ribbon and in planes, respectively, upon opposite sides of the plane of the fencing-ribbon, and provided at intervals with loops for the reception of cane-stems which are arranged in rows, respectively, upon opposite sides of the plane of the fencing-ribbon, substantially as specified.

In testimony that I claim the foregoing as my own I have hereto affixed my signature in the presence of two witnesses.

FRANK E. FOOR.

Witnesses:
J. W. SPIEKELMIES,
JOHN B. SHELBY.